Jan. 6, 1970  G. SCHOLZ  3,487,632
SHOCKPROOF BALANCE-STAFF BEARING
Filed Dec. 16, 1968
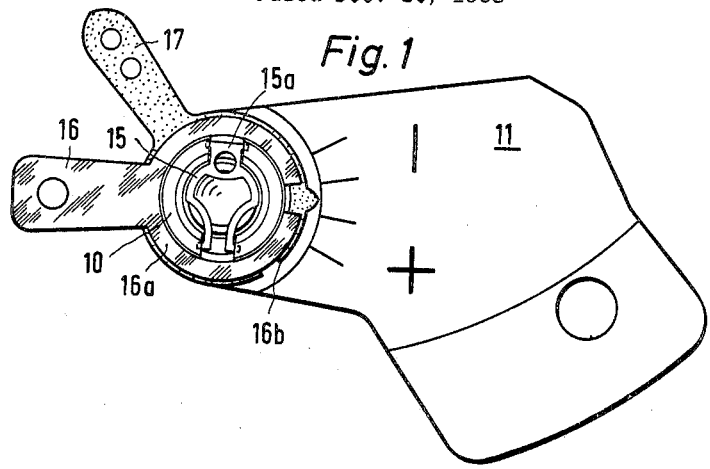
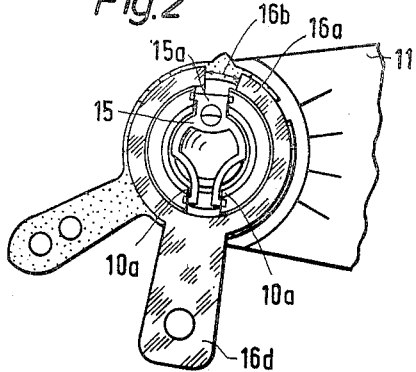
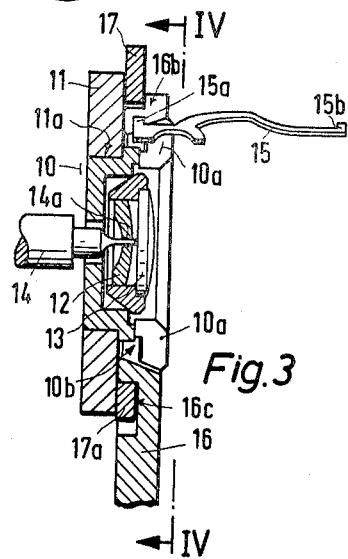
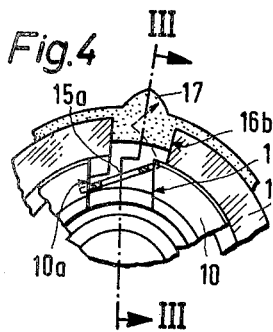
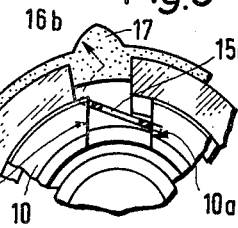
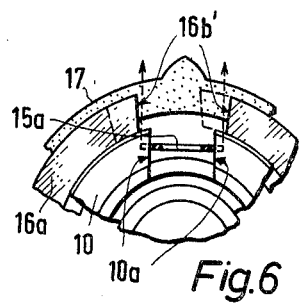
INVENTOR.
Gunther Scholz
BY
Laurence R. Brown
Attorney United States Patent Office 3,487,632
Patented Jan. 6, 1970

3,487,632
SHOCKPROOF BALANCE-STAFF BEARING
Gunther Scholz, Schramberg, Wurttemberg, Germany, assignor to Messrs. Gebruder Junghans Gesellschaft mit beschrankter Haftung, Schramberg, Wurttemberg, Germany, a corporation of Germany
Filed Dec. 16, 1968, Ser. No. 792,885
Claims priority, application Germany, Dec. 18, 1967,
J 17,328
Int. Cl. G04b 31/02
U.S. Cl. 58—140                                     6 Claims

ABSTRACT OF THE DISCLOSURE

A jeweled balance-staff is disclosed having a retainer spring for holding the bearing assembly in place and hinged about a pair of pins with a retainer member which pivotably aligns a disassembly slot opposite the hinge of the spring to remove it.

Background of the invention

The invention relates to a shockproof balance-staff bearing, wherein the parts of the bearing are held in a ring-shaped bearing setting by a holding spring that is hinged to swing away from the bearing. The hinge pins for the spring are located on one end in a pivot space that is open along the outer circumference of the bearing setting, the pivot space being enveloped by a ring that surrounds the bearing setting. The holding spring of balance-bearings of this design in the prior art is securely fixed to the bearing setting, and can be removed only with difficulty by pressing the bearing setting out of its seat in the balance cock and removing the ring from the bearing setting.

Summary of the invention

The purpose of the invention is to produce a shockproof balance-staff bearing in which the holding spring can be easily removed from the bearing setting, although the spring is securely fixed to the setting in operational position.

In accordance with the invention, the ring on the bearing setting can be turned and is provided in its circumference with a disassembly slot through which the hinge end of the holding spring can be removed. The ring in operating position closes the pivot space to ensure that the spring cannot accidentally loosen from the bearing setting. To remove the spring, it is only necessary to turn the ring until its slot is positioned opposite the hinge of the spring. The disassembly slot can be made narrower than the distance between the ends of the hinge of the spring; in this case, when removing the spring, the disassembly slot is positioned opposite but slightly shifted with respect to the hinge, and the spring is turned in its plane. This construction prevents the spring from loosening from the bearing setting even when the disassembly slot is positioned opposite the hinge.

In accordance with the invention, the disassembly slot can also be made wider than the distance between the outer ends of the hinge.

In the preferred embodiment of the invention, the retaining ring forms the bearing eye of an element that forms part of the balance-staff bearing. In most cases, this element will be the carrier for the balance-spring stud. With a balance upper bearing, which does not have a carrier, the balance-spring stud is fixed directly in the balance cock and the ring forms the bearing eye of the regulator.

When the carrier for the balance-spring stud or the regulator incorporate the retaining ring, and the ring is provided with a disassembly slot, the bearing setting is mounted in the balance cock at such an angular position that the hinge of the spring lies outside of the arc through which the disassembly slot is moved when the carrier or the regulator is adjusted to regulate the watch.

Other aspects and advantages of the invention will be apparent from the following detailed description.

Brief description of the drawing

The invention will be described, with reference to the figures of the drawing, wherein:

FIG. 1 is a top view of the balance-staff bearing of the invention in the safety position;

FIG. 2 is a view corresponding to that of FIG. 1, with the bearing in position for removal of the holding spring;

FIG. 3 is a side view of the bearing, taken along line III—III of FIG. 4, with the holding spring raised;

FIGS. 4 and 5 are top views taken along line IV—IV of FIG. 3, with the disassembly slot shifted to one side and the other of the hinge of the spring; and FIG. 6 is a top view corresponding to those of FIGS. 4 and 5 of a modification of the disassembly slot.

Description of the preferred embodiments

The shockproof balance-staff bearing illustrated in FIGS. 1 to 6 is of known construction. The bearing setting 10 has the shape of a ring-like disc. The diametrically smaller part of the setting is pressed into a hole 11a of the balance cock 11. The recess in the setting 10 holds the balance jewel 12 and the endstone 13 for the pivot 14a of the balance staff 14. The upper face of the setting 10 incorporates a diametrical slot 10a, which holds the essentially U-shaped holding spring 15, secures it against lateral movement, and guides it when it is swung open, as shown in FIG. 3. The base of the spring 15 embodies lateral hinge pins 15a, and the free end of each spring blade incorporates a locking nose 15b. When the tensed spring is in place and acting on the parts of the bearing, the hinge pins 15a and the locking noses 15b lie in a groove 10b embodied in the outer circumference of the bearing setting 10. The groove connects to the diametrical slot 10a. The part of the bearing setting 10 having the larger diameter and resting on the balance cock 11 is closely surrounded by the bearing eye 16a of the carrier 16 for the balance-spring stud. The eye incorporates a slot 16b, which, in the embodiment shown in FIGS. 1 to 5, is narrower than the base (or hinge) of the holding spring 15; in other words, it is narrower than the distance between the outer ends of the two hinge pins 15a. If the spring is 0.8 mm. wide, for example, the disassembly slot 16b can be 0.5 mm. wide. In order to remove the spring 15, the slot 16b must be slightly shifted to one side with respect to the hinge of the spring 15 (see FIGS. 4 to 5). The spring is then turned somewhat in its plane in the slot 10a so that one of the hinge pins 15a projects into the slot 16b. By turning the spring slightly more, the hinge of the spring can be removed through the slot 16b.

As shown in FIG. 6, the disassembly slot 16b' can be made wider than the hinge of the spring 15, whereby the spring can be removed in a radial direction without previously having turned it in the slot 10a. There is, however, less possibility that the spring will accidentally loosen from the bearing setting 10 when the slot 16b is narrower than the hinge of the spring.

The spring 15 is mounted on the setting 10 by reversing the steps just described.

The regulator 17 with its eye 17a is pivotally mounted between the carrier 16 for the balance-spring stud and the balance cock 11. To this end, the lower face of the carrier 16 embodies a recess 16c; and the regulator 17 is not protected by the holding spring 15. If the balance-staff bearing does not have a carrier for the balance-spring stud, and instead the balance-spring stud is fixed in the balance cock, the regulator is provided with a suitable disassembly slot and takes over the previously described function of the carrier for the balance-spring stud.

A comparison of FIGS. 1 and 2 shows that the bearing setting 10 is pressed into the balance cock 11 at such an angular position that its diametrical slot 10a is 90° away from the disassembly slot 16b of the carrier 16, when the latter is in the position it occupies when the movement is regulated. This prevents any accidental releasing of the spring 15 while the watch movement is being regulated, since the diametrical slot lies outside of the arc through which the disassembly slot is moved during regulation.

When the spring 15 is to removed, the carrier 16 is turned counterclockwise through approximately 90° until the position in FIG. 4, 5 or 6 is reached.

What is claimed is:

1. A shockproof balance-staff bearing assembly, including a bearing and ring-shaped bearing setting, a spring assembly for resiliently holding the parts of the bearing in the bearing setting including a spring mounted by hinge pins incorporated at one end of said spring to permit the spring to pivot away from the bearing, a pivot space that is open along the outer circumference of said bearing setting for retaining said hinge pins to pivot the spring therein, and a retainer ring surrounding said bearing setting for covering said pivot space to prevent said hinge pins from accidentally escaping from said pivot space wherein a disassembly slot is incorporated in said retainer ring for freeing said hinge pins from said pivot space to remove said spring from the bearing, and wherein said retainer ring is free to turn with respect to said bearing setting, whereby said disassembly slot can be positioned opposite said hinge pins when desirable to remove the spring from said pivot space.

2. The shockproof balance-staff bearing assembly as defined in claim 1, wherein the width of said disassembly slot is sufficiently less than the distance between the outer ends of said hinge pins so that said spring can be removed only when the latter is turned in its plane, whereby said hinge pins are turned in the plane of said disassembly slot.

3. The shockproof balance-staff bearing assembly as defined in claim 1, wherein the width of said disassembly slot is greater than the distance between the outer ends of said hinge pins.

4. The shockproof balance-staff bearing assembly as defined in any one of claims 1, 2 or 3, wherein said ring forms the bearing eye of a carrier for the balance-spring stud.

5. The shockproof balance-staff bearing assembly as defined in any one of claims 1, 2 or 3 wherein said ring forms the bearing eye of a regulator assembly.

6. The shockproof balance-staff bearing as defined in claim 4, including in said bearing setting a diametrical slot connected to said pivot space for accepting the part of said spring that incorporates said hinge pins, said diametrical slot permitting said spring to pivot, and a balance cock in which said bearing setting is mounted, and wherein the angular position of said bearing setting in said balance cock ensures that said pivot space lies outside of the arc through which said disassembly slot is moved when the watch movement is regulated.

References Cited

UNITED STATES PATENTS

| | | | |
|---|---|---|---|
| 2,233,743 | 3/1941 | Marti | 58—140 |
| 2,664,697 | 1/1954 | Vuilleumier | 58—140 |
| 2,746,239 | 5/1956 | Vuilleumier | 58—140 |
| 2,958,998 | 11/1960 | Matthey | 58—140 |
| 3,237,394 | 3/1966 | Sholez et al. | 58—140 |

RICHARD B. WILKINSON, Primary Examiner

STANLEY A. WAL, Assistant Examiner